US006539724B2

(12) United States Patent
Cornwell et al.

(10) Patent No.: US 6,539,724 B2
(45) Date of Patent: Apr. 1, 2003

(54) AIRBLAST FUEL ATOMIZATION SYSTEM

(75) Inventors: Michael Dale Cornwell, Bloomington, MN (US); Anthony William Newman, Lincoln (GB); Vladimir Dusan Milosavljevic, Finspong (SE)

(73) Assignee: Delavan Inc, West Des Moines, IA (US)

( * ) Notice: Subject to any disclaimer, the term of this patent is extended or adjusted under 35 U.S.C. 154(b) by 0 days.

(21) Appl. No.: 09/823,149

(22) Filed: Mar. 30, 2001

(65) Prior Publication Data

US 2002/0139121 A1 Oct. 3, 2002

(51) Int. Cl.7 .............................. B05B 7/08; B05B 7/10; F02C 7/22

(52) U.S. Cl. ............................ 60/776; 60/746; 239/406

(58) Field of Search .......................... 60/736, 740, 746, 60/776; 239/398, 399, 400, 403, 405, 406

(56) References Cited

U.S. PATENT DOCUMENTS 1,564,064 A * 12/1925 Hannah ...................... 239/405
3,777,983 A * 12/1973 Hibbins ...................... 239/406
4,434,766 A * 3/1984 Matsuoka et al. .......... 239/405
4,648,835 A * 3/1987 Eisenhawer et al. ..... 239/424.5
5,450,724 A * 9/1995 Kesseli et al. ................ 60/746
5,566,887 A * 10/1996 Wymaster, Jr. ............. 239/406
5,680,765 A * 10/1997 Choi et al. ..................... 60/746
6,029,910 A * 2/2000 Joshi et al. ................. 239/404
6,151,899 A * 11/2000 Park ............................ 60/746
6,371,387 B1 * 4/2002 Nally et al. ................. 239/406

* cited by examiner

*Primary Examiner*—Michael Koczo
(74) *Attorney, Agent, or Firm*—Cummings & Lockwood LLC

(57) ABSTRACT

An airblast fuel injector assembly for use in conjunction with a gas turbine is disclosed which includes an elongated tubular body having first and second concentric tubes separated from one another by a helical spacer wire so as to define a fuel passage therebetween. The injector assembly is situated such that fuel flow exiting the fuel passage is intersected by an air flow at a predetermined angle of incidence so as to atomize the fuel flow.

14 Claims, 5 Drawing Sheets

AIRBLAST FUEL ATOMIZATION SYSTEM

BACKGROUND OF THE INVENTION

1. Field of the Invention

The subject invention is directed to a fuel injection system for industrial gas turbines, and more particularly, to a fuel injection system for atomizing industrial grade fuels in gas turbines during ignition.

2. Background of the Related Art

Gas turbines are employed in a variety of industrial applications including electric power generation, pipeline transmission and marine transportation. A common problem associated with industrial gas turbines is the difficulty associated with initiating fuel ignition during engine startup cycles. Moreover, during startup, the fuel must be presented in a sufficiently atomized condition to initiate and support ignition. However, at engine startup, when the engine is gradually spooling up, the fuel and/or air pressure needed to atomize the fuel is generally unavailable.

A broad range of fuel injection devices and methods have been developed to enhance fuel atomization during engine ignition sequences. One approach has been to employ pressure atomizers, which, in order to operate at the low fuel flow rates present at ignition, have small fluid passages that generate the high fuel velocities needed to effect atomization. However, these small passages are susceptible to fuel contamination and carbon formation, and thus limit the service life of the fuel injector with which they are associated.

In contrast, large aircraft engines can start on conventional pure air-spray injectors and benefit from the long service life experienced with airblast atomizers which utilize the kinetic energy of a flowing air stream to shatter a fuel sheet into fine droplets. This is possible because a jet aircraft engine uses lighter aviation fuel, and typically has an auxiliary power unit that can spin the engine to a sufficiently high speed to produce the differential air pressure required to start an airblast atomizer. Most airblast atomizers in use today are of the prefilming type, wherein fuel is first spread out into a thin continuous sheet and then subjected to the atomizing action of a high velocity air flow.

Typically, at ignition, airblast atomizers have difficulty atomizing heavy viscous industrial fuels, such as diesel fuel. This is because industrial grade fuels such as DF-2, as compared to lighter less viscous fuel such as aviation grade Jet-A, require a greater differential air pressure to effect atomization.

It would be beneficial to provide a fuel injection system for industrial gas turbines that is adapted and configured to efficiently atomize industrial grade fuels under the relatively low air pressure conditions that exist during engine ignition. There is also a need in the art for a low cost fuel injector for use in conjunction with industrial gas turbines that does not have the type of structural features that are susceptible to fuel contamination and carbon formation, as is found in pressure atomizers.

SUMMARY OF THE INVENTION

The subject invention is directed to a low-cost airblast fuel injector for use in conjunction with industrial gas turbines, and more particularly, to a fuel injector for use in conjunction with a system and method for atomizing industrial grade fuel issuing from the injector. The term airblast is used herein to describe the way in which the fuel issuing from the nozzle is atomized, i.e., by way of the energy transferred to the fuel from an air stream rather than by way of the energy of the fuel flow itself.

The fuel injector of the subject invention includes an elongated tubular body having at least first and second concentric tubes separated from one another by a helical spacer wire so as to define a annular fuel passage therebetween configured to issue a swirling extruded fuel film that is easily atomized by an intersecting air stream. Preferably, the first tube is an outer tube and the second tube is an inner tube, and the helical spacer wire is supported on an exterior wall of the inner tube, by means such as brazing or the like.

The subject invention is further directed to a fuel nozzle which includes a nozzle body having a discharge section with an interior chamber. The discharge section has a fuel inlet port formed therein for admitting an extruded fuel film into the interior chamber thereof. The discharge section also has an air inlet port disposed adjacent to the fuel inlet port for directing an air stream into the interior chamber of the discharge section so as to intersect the fuel film at a predetermined angle to effect atomization of the fuel film.

The nozzle assembly further includes an airblast fuel injector constructed in accordance with the subject invention which communicates with the fuel inlet port. The fuel injector has an elongated tubular body including inner and outer concentric tubes that are separated from one another by a helical spacer wire so as to define a fuel passage therebetween. In accordance with the subject invention, the air inlet port formed in the discharge section of the fuel nozzle is oriented and configured in such a manner so as to direct air at the fuel film at a predetermined angle of incidence so as to atomize the fuel flow.

The subject invention is further directed to a nozzle assembly which includes a nozzle body having a discharge section with an interior chamber that defines a central axis. An annular swirl plate is disposed within the interior chamber of the discharge section. The swirl plate has a plurality of circumferentially spaced apart air channels formed therein for directing air radially inwardly in a plane extending generally perpendicular to the central axis of the interior chamber. In addition, the swirl plate has a plurality of circumferentially spaced apart fuel inlet ports formed therein. Each fuel inlet port is adapted to admit an extruded fuel film into the interior chamber of the discharge section at a location that is adjacent to a radially inner end of a corresponding air channel. As a result, the air flowing through each channel intersects a corresponding fuel film at a predetermined angle to effect atomization of the fuel film. Preferably, each fuel inlet port is aligned with the central axis of the interior chamber of the discharge section such that the air flowing through each channel intersects the fuel film issuing from each fuel inlet at a 90 degree angle.

The fuel nozzle further includes an airblast fuel injector constructed in accordance with the subject invention which communicates with each fuel inlet port of the swirl plate. Each fuel injector has an elongated tubular body including inner and outer concentric tubes that are separated from one another by a helical spacer wire so as to define a fuel passage therebetween.

The subject invention is also directed to a method of atomizing fuel which includes the initial step of providing a fuel injector having an elongated tubular body including inner and outer concentric tubes that are separated from one another by a helical spacer wire so as to define a fuel passage therebetween. The method further includes the steps of flowing fuel through the fuel passage of the tubular body so as to extrude the fuel flow, and intersecting the extruded fuel flow exiting the fuel passage of the tubular body with an air flow at a predetermined angle of incidence so as to atomize the extruded fuel flow.

In accordance with the subject invention, the extruded fuel flow exiting the fuel passage is intersected with an air flow at an angle of incidence ranging from about parallel with an axis of the tubular body to perpendicular to the axis of the tubular body. The method also includes the steps of flowing a fluid such as air, fuel or water through the inner tube so as to modify the spray characteristics of the injector, and providing the air flow from turbine compressor discharge air or from an auxiliary air compressor.

An important aspect of the low-cost fuel injector of the subject invention that sets it apart from existing fuel atomization devices known in the art, such as airblast atomizers and pressure atomizers, is the absence of precision machined components needed to produce a fine spray of atomized fuel. Moreover, the fuel injector of the subject invention does not have small flow passages consisting of fine slots, vanes or holes that swirl the fuel flow and produce a thin film that can be atomized. Precision machining of such passages is generally required to ensure that all of the injectors utilized with an engine flow at the same fuel flow rate, spray angle and droplet size distribution.

These and other aspects of the subject invention and the method of using the same will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention pertains will more readily understand how to make and use the fuel atomization system of the subject invention, preferred embodiments thereof will be described in detail hereinbelow with reference to the drawings, wherein.

DETAILED DESCRIPTION OF PREFFERED EMBODIMENTS

Figure 1:
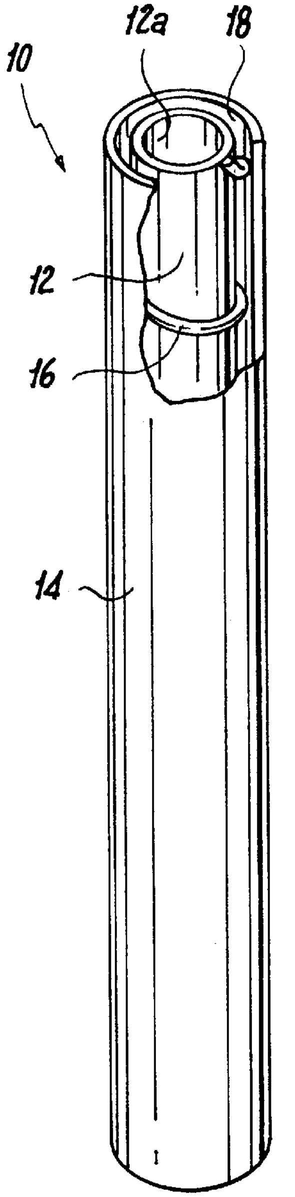
FIG. 1 is a perspective view of an airblast fuel injector constructed in accordance with a preferred embodiment of the subject invention.
Figure 3:
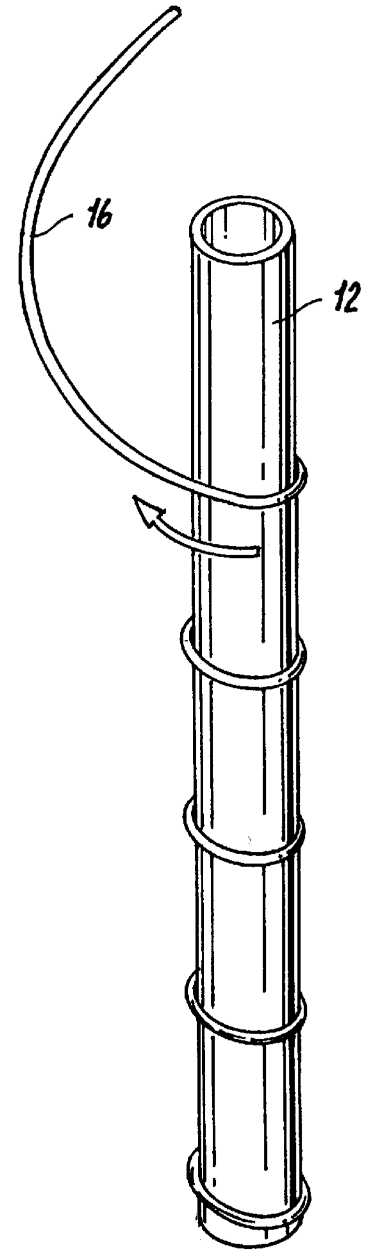
FIG. 3 is a perspective view of the inner tubular member of the airblast fuel injector of FIG. 1 with helical spacer wire wrapped about the outer periphery thereof.
Figure 5:
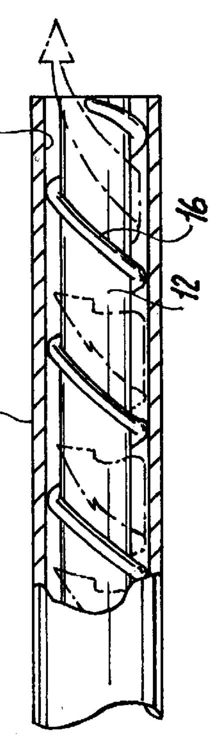
FIG. 5 is a side elevational view in partial cross-section of the airblast fuel injector of the subject invention illustrating the helical fuel flow path that extends therethrough.

Referring now to the drawings wherein like reference numerals identify similar structural features of the apparatus disclosed herein, there is illustrated in FIG. 1 an airblast fuel injection device constructed in accordance with a preferred embodiment of the subject invention and designated generally by reference numeral 10. Fuel injection device 10 preferably includes concentric inner and outer tubular members 12 and 14. The tubular members are maintained in a coaxially spaced apart relationship by a helical spacer wire 16 wrapped around the inner tubular member 12, as illustrated in FIG. 3. Spacer wire 16 is preferably brazed onto the exterior surface of inner tubular member 12 and defines an annular fuel passage 18 between the inner and outer tubular members, which is best seen in FIG. 5.

Figure 2:
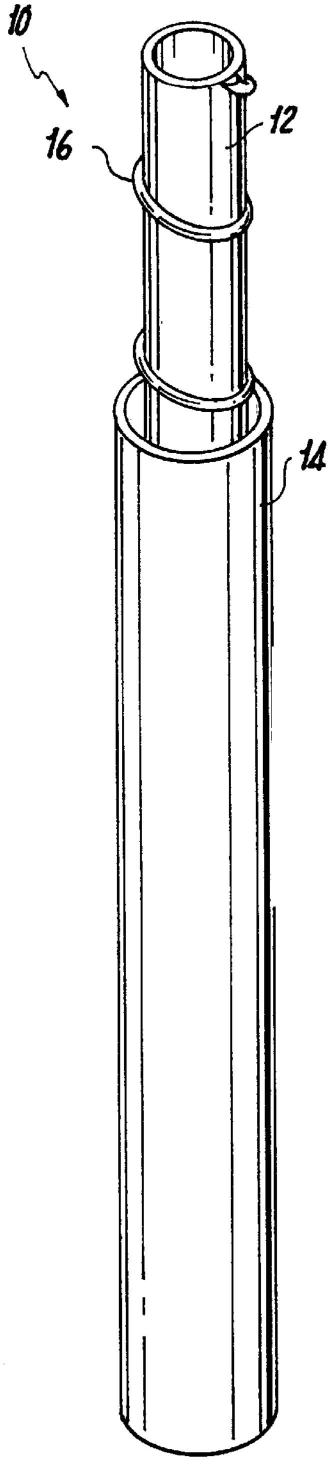
FIG. 2 is a perspective view of the airblast fuel injector of FIG. 1 with the inner and outer tubes thereof separated for ease of illustration.

The inner and outer tubular member 12 and 14 are not fastened together. This allows the outer tubular member 14 to move axially with respect to the inner tubular member 12, as shown for example in FIG. 2. As a result, the two concentric tubes can exist at different temperatures within the combustion chamber of the engine, unaffected by thermal stress and expansion. While illustrated as having a relatively short axial length, it is envisioned that the concentric tubular members of injector 10 can have a sufficient length so as to accommodate critical fuel flow metering devices, such as a metering orifice, remote from the high temperatures that are found within the combustion chamber of a gas turbine.

It is also envisioned, and well within the scope of the subject invention that the fuel injector described and illustrated herein can include more than two concentric tubes. Thus, plural annular channels would be provided in each injector, and each channel could accommodate a different fluid. This would enable the spray characteristics of the fuel injector to be altered for different engine applications.

In use, fuel exits fuel passage 18 as a swirling extruded film, the thickness of which is governed by the width of the fuel passage. Air is then directed across the exit of these concentric tubes in order to breakup the extruded film of fuel into a fine mist of droplets, as shown for example in FIGS. 7 and 8. The angle of the intersecting air with respect to the axis of the concentric tubular members 12 and 14 can vary from parallel to perpendicular to effect the spray characteristics of the injector.

More particularly, the mean diameter of the droplets can be adjusted by varying the incident angle between the fuel and air streams. It has been determined that the droplet size is largest when the intersection angle is near parallel and smallest when the angle is perpendicular. In addition, the position of the droplets can be controlled by the relative momentum of the fuel and air streams, and the intersecting angle. It is also envisioned that other fluids such as air, fuel and water can be feed through the interior bore 12*a* of inner tubular member 12 to modify the spray characteristics of injector 10.

It is envisioned that different structural features can be employed to direct the required air stream toward the fuel film exiting the fuel passage 18 of injector 10. These structural features for directing air include, but are not limited to vanes, slots and apertures. Fuel nozzles employing such features are described hereinbelow. It is also envisioned that the source of the air directed at the fuel can differ depending upon the particular engine application with which the fuel injector is employed. For example, the source of air could be compressor discharge air or external air supplied by an auxiliary air compressor.

While, in general, fuel is issued from the fuel injector 10 of the subject invention during an engine start-up cycle, at other loads or operating conditions such as, for example, at full engine load or when the engine is operating on natural gas, no fuel is ejected from the injectors. Instead, only a small amount of purge air is delivered through the fuel passage 18 to clean the injector 10. This will reduce coking and carbon formation within the fuel passage, thereby extending the useful service life of the injector.

Figure 4:
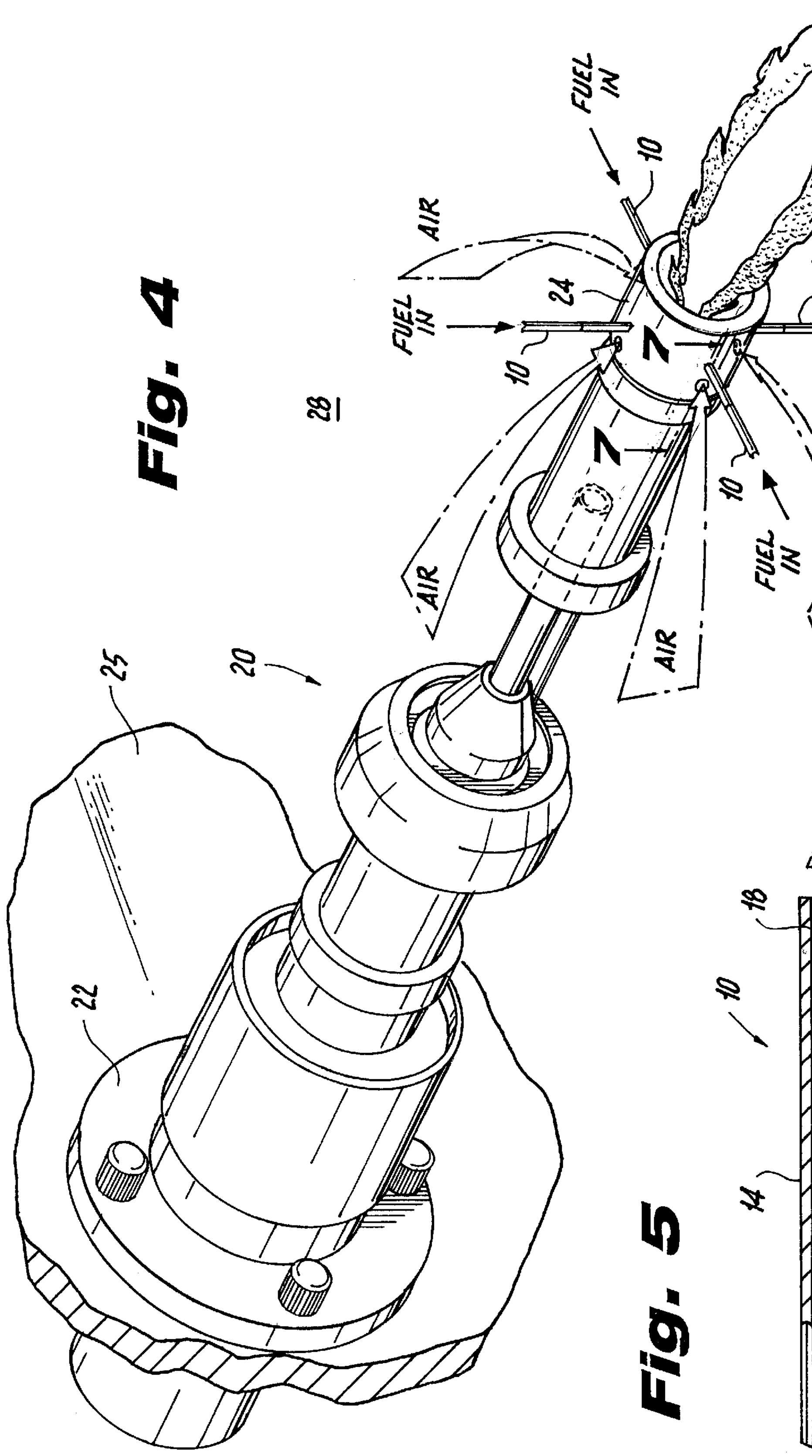
FIG. 4 is a perspective view of a fuel nozzle which employs several of the airblast fuel injectors of the subject invention.

Referring now to FIG. 4, there is illustrated a fuel nozzle 20 having a mounting flange 22 at the rearward end thereof and a substantially cylindrical discharge bell 24 at the forward end thereof. Mounting flange 22 is adapted to secure the fuel nozzle 20 to the wall 25 of the combustion chamber of a gas turbine engine, so that the discharge bell 24 is positioned within the combustion chamber 28. Typically, the discharge bell 24 supports a flame to facilitate fuel ignition, particularly during an engine startup cycle. During startup, the discharge bell 24 is subjected to air pressure equal to the pressure drop across the combustion liner of the engine, which is typically 2 to 3% of the combustor pressure or 3 to 9 psi.

Figure 6:
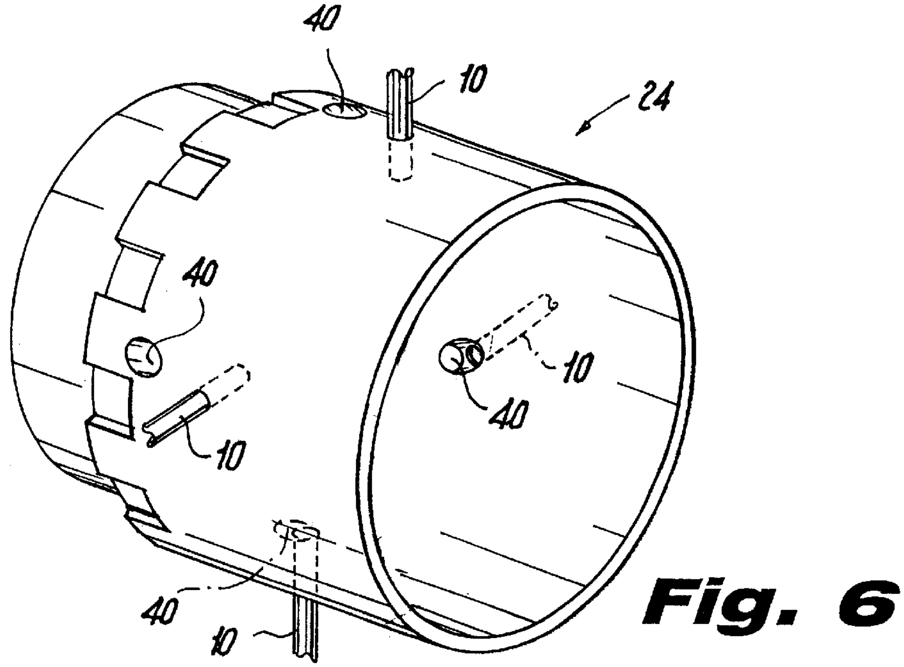
FIG. 6 is an enlarged perspective view of the discharge portion of the fuel nozzle of FIG. 5.
Figure 7:
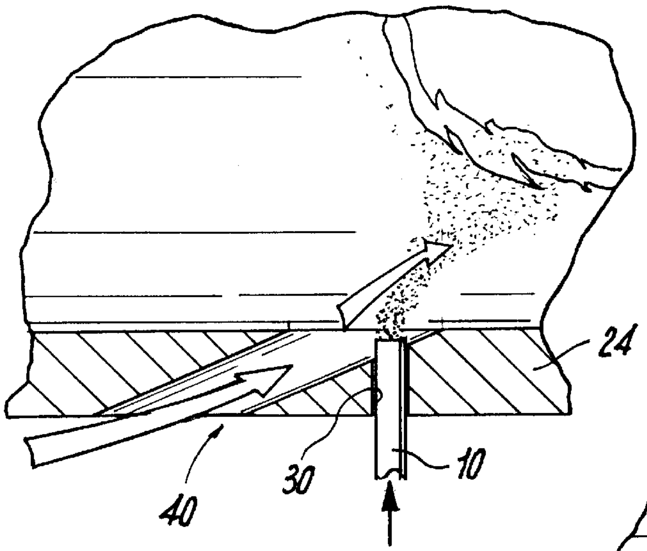
FIG. 7 is a cross-sectional view of the discharge portion of the fuel nozzle of FIG. 4 taken along line 7—7 with the air inlet configured to direct combustor discharge air toward the fuel film exiting the fuel injector at an incident angle of about 30 degrees relative to the axis of the nozzle.
Figure 8:
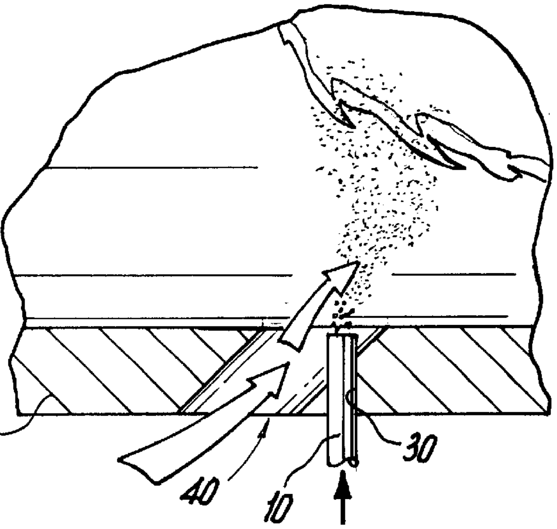
FIG. 8 is a cross-sectional view of the discharge portion of the fuel nozzle of FIG. 4 taken along line 7—7 with the air inlet configured to direct combustor discharge air toward the fuel film exiting the fuel injector at an incident angle of about 45 degrees relative to the axis of the nozzle.

As illustrated in FIG. 6, four circumferentially spaced apart fuel injectors 10 constructed in accordance with a preferred embodiment of the subject invention are operatively associated with the discharge bell 24 of the nozzle 20. In this instance, they function as pilot injectors to stabilize the flame within the interior chamber of the discharge bell 24. As best seen in FIGS. 7 and 8, the distal end portion of each fuel injector 10 extends through a corresponding fuel inlet aperture 30 that extends through the wall of the discharge bell 24 and opens into the interior chamber thereof. Preferably, the fuel inlet apertures 30 are formed so that the axis of each fuel injector 10 is radially aligned with the central axis of the discharge bell 24. This orientation may vary depending upon the design requirements of a particular engine application. The fuel injectors are stationed so that the distal end of each injector is spaced about 5 mm from the flame supported within the discharge bell 24.

Those skilled in the art will readily appreciate that the number of fuel injectors employed in a particular fuel nozzle can vary depending upon the engine application. For example, a fuel nozzle can employ two diametrically opposed fuel injectors to achieve sufficient atomization. It is envisioned that the fuel injectors associated with a particular fuel nozzle would communicate with a manifold that would distribute fuel to each of the injectors from a fuel pump.

Referring to FIG. 6, an air inlet port 40 is positioned adjacent each fuel inlet aperture 30 for facilitating the ingress of air into the discharge bell 24, and more particularly, for directing compressor discharge air at the fuel film exiting from the fuel passage 18 of each of the fuel injectors 10 at an angle of incidence sufficient to atomize the fuel film. Air inlet ports 40 extend through the wall of the discharge bell 24 and are formed in such a manner so as to direct air at the fuel film at an incident angle of about 45 degrees.

The orientation of the fuel inlet ports 40 and hence the incident angle of the air flowing therefrom, will vary depending upon the design requirements of a particular engine application. For example, as shown in FIG. 7, an air inlet port 40 can be configured to direct combustor discharge air toward the fuel film exiting the fuel injector 10 at a relatively low incident angle of about 30 degrees relative to the axis of the nozzle 20.

Alternatively, as shown in FIG. 8, an air inlet port 40 can be configured to direct combustor discharge air toward the fuel film exiting the fuel injector 10 at a relatively high incident angle of about 45 degrees relative to the axis of the nozzle. It has been determined that fuel atomization is maximized when the air stream is directed at the fuel film at a high angle of incidence. In addition, as noted above, the size and position of the droplets of atomized fuel can be adjusted by varying the incident angle between the fuel exiting the injector and air stream exiting the air inlet port.

Figure 9:
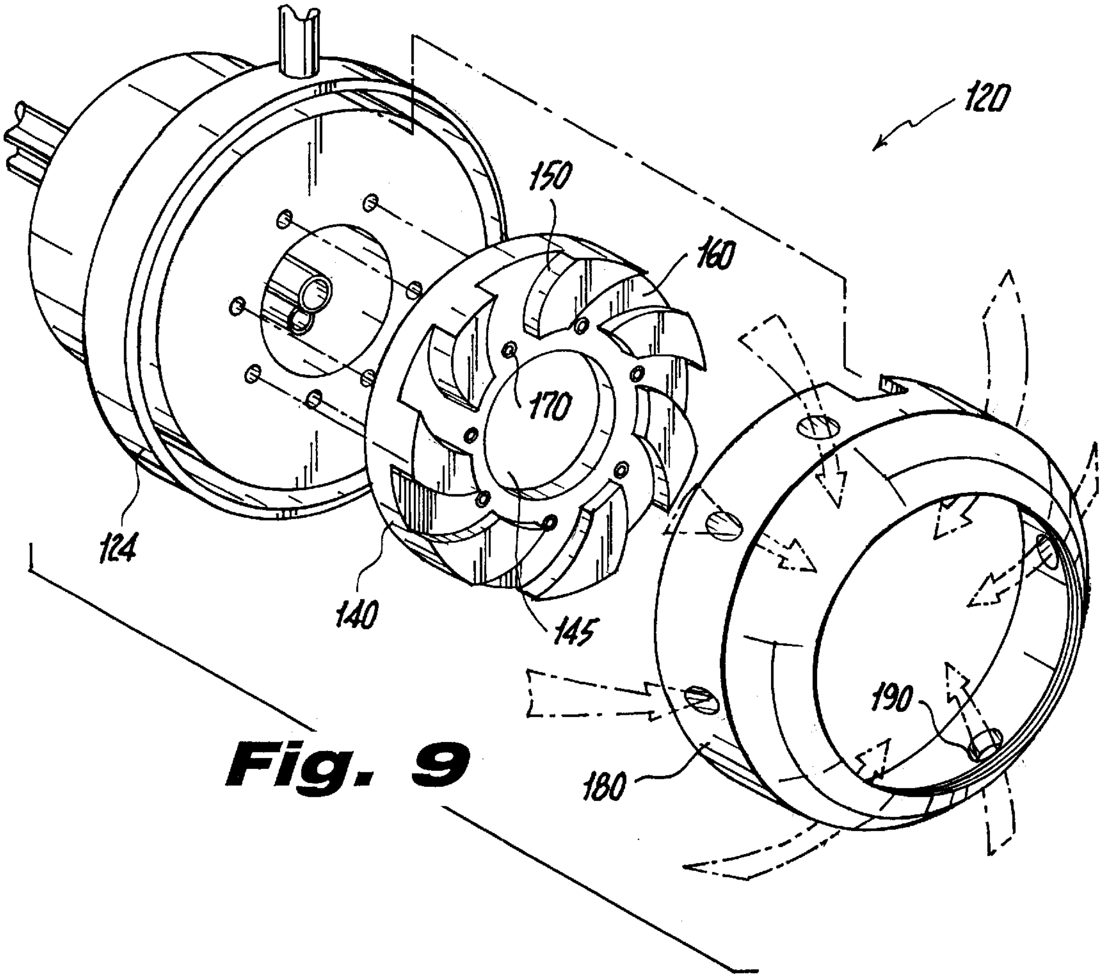
FIG. 9 is an exploded perspective view of the discharge portion of another fuel nozzle constructed in accordance with a preferred embodiment of the subject invention which includes an air swirler having associated therewith a plurality of circumferentially disposed airblast fuel injectors.

Referring to FIG. 9, there is illustrated another fuel nozzle constructed in accordance with a preferred embodiment of the subject invention designated generally by reference numeral 120. Fuel nozzle 120 includes a nozzle body 124 that includes an annular swirl plate 140 having a central aperture 145 for supporting a flame generated by the atomization of fuel within the nozzle. Swirl plate 140 has a plurality of circumferentially spaced apart swirl vanes 150 which define a corresponding plurality of circumferentially spaced apart channels 160 configured to impart a swirling motion to air passing therethrough.

Figure 10:
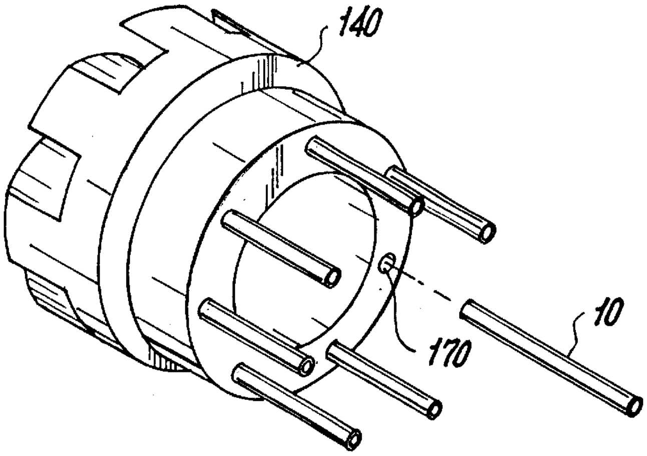
FIG. 10 is a perspective view of the air swirler of the fuel nozzle shown in FIG. 9, rotated 180 degrees to illustrate the plural fuel injectors.

An axially extending fuel inlet bore 170 is formed adjacent the radially inward end of each channel 160. Each fuel inlet bore 170 extends through the swirl plate and is configured to support the distal end portion of a corresponding tubular fuel injector 10, as illustrated in FIG. 10. As shown, the axis of each fuel injector is aligned with the central axis of the swirl plate. As in the previous embodiment, it is envisioned that each of the tubular fuel injectors 10 are operatively associated with a manifold that distributes fuel among the injectors. An air cap 180 surrounds swirl plate 140 and is provided with a plurality of circumferentially spaced apart air inlet ports 190 that direct compressor discharge air into the channels 160 of swirl plate 140, as depicted in FIG. 9.

Figure 11:
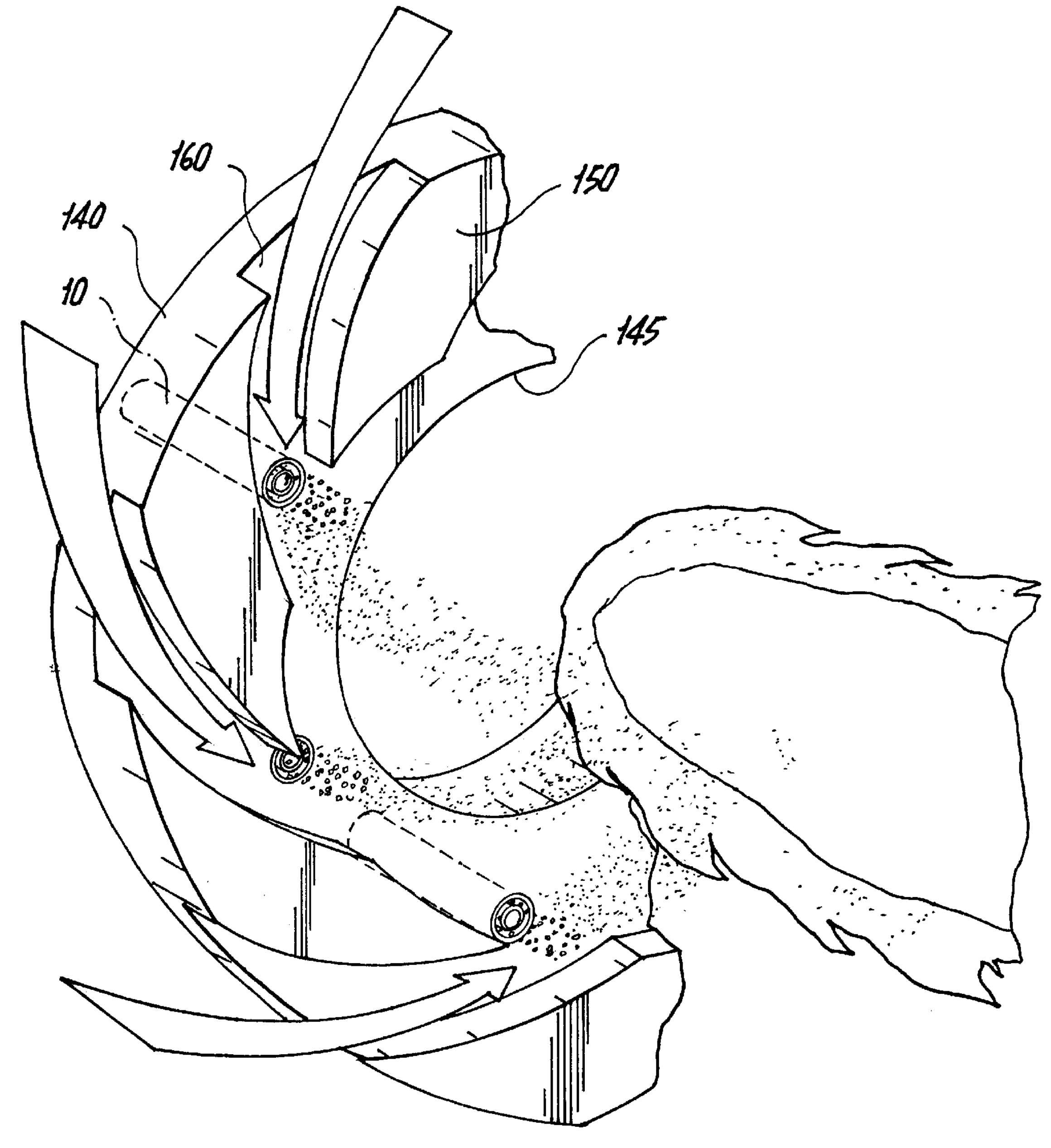
FIG. 11 is an enlarged perspective view of the air swirler shown in FIGS. 9 and 10, illustrating the flow of air therethrough to atomize the fuel exiting the fuel injectors.

Referring to FIG. 11, in operation, during an engine start-up cycle, relatively low pressure compressor discharge air is directed through the inlet ports 190 of air cap 180 and into the channels 160 formed between the swirl vanes 150 of swirl plate 140. The air streams flowing through channels 160 are directed radially inwardly so as to intersect the extruded low velocity, low pressure fuel films issuing from the fuel injectors 10 at an incident angle of 90 degrees. The relatively high incident angle between the air streams and the fuel films maximizes fuel atomization within the fuel nozzle 120. Moreover, because the air flows are delivered at such a steep angle to the fuel streams, the transfer of energy from the air streams to the fuel films is very direct and efficient. This factor, combined with the ability of the concentric tube fuel injector 10 to produce an extruded fuel film at relatively low fuel flow rates, makes the injector particularly well suited to start gas turbine engines on industrial grade fuels.

Although the fuel injector of the subject invention and the fuel nozzles employing the fuel injector of the subject invention have been described with respect to preferred embodiments, those skilled in the art will readily appreciate that changes and modifications may be made thereto without departing from the spirit and scope of the present invention as defined by the appended claims. Moreover, those skilled in the art should readily appreciate that the fuel injector of the subject invention can be employed with fuel nozzles other than those described herein, as such fuel nozzles are merely intended as examples, and are not intended to limit the scope of the subject disclosure in any way.

What is claimed is:

1. A method of atomizing fuel comprising the steps of:

a) providing a fuel injector having an elongated tubular body including inner and outer concentric tubes that are separated from one another by a helical spacer wire so as to define a fuel passage therebetween;

b) flowing fuel through the fuel passage so as to extrude the fuel flow; and c) intersecting the extruded fuel flow exiting the fuel passage with an air flow at a predetermined angle of incidence so as to atomize the extruded fuel flow.

2. A method according to claim 1, including intersecting the extruded fuel flow exiting the fuel passage with an air flow at an angle of incidence ranging from about parallel with an axis of the tubular body to perpendicular to the axis of the tubular body.

3. A method according to claim 1, further comprising the step of flowing fluid through the inner tube.

4. A method according to claim 1, wherein the source of the air flow is compressor discharge air.

5. A method according to claim 1, wherein the source of the air flow is an external air compressor.

6. A fuel nozzle comprising:

a) a nozzle body including a discharge section having an interior chamber, the discharge section having a fuel inlet port formed therein for admitting an extruded fuel film into the interior chamber thereof, and an air inlet port adjacent the fuel inlet port for directing an air stream into the interior chamber of the discharge section so as to intersect the fuel film at a predetermined angle to effect atomization of the fuel film; and b) a fuel injector communicating with the fuel inlet port, the fuel injector having an elongated tubular body including inner and outer concentric tubes that are separated from one another so as to define a fuel passage therebetween.

7. A fuel nozzle as recited in claim 6, wherein the air inlet port is oriented and configured in such a manner so as to direct an air stream across a fuel film at an angle of incidence ranging from about parallel with an axis of the tubular body to about perpendicular to the axis of the tubular body.

8. A fuel nozzle as recited in claim 6, wherein the outer tube and the inner tube are separated from one another by a helical spacer wire supported on an exterior wall of the inner tube.

9. A fuel nozzle as recited in claim 8, wherein the helical spacer wire is brazed onto the exterior surface of the inner tube.

10. A fuel nozzle as recited in claim 6, wherein the inner tube is adapted to receive a fluid media.

11. A fuel nozzle as recited in claim 6, wherein the discharge section has at least two fuel inlet ports for admitting fuel into the interior chamber of the discharge section, and each fuel inlet port has a corresponding air inlet port associated therewith.

12. A fuel nozzle comprising:

a) a nozzle body including a discharge section having an interior chamber defining a central axis, and an annular swirl plate disposed within the interior chamber of the discharge section, the swirl plate having a plurality of circumferentially spaced apart air channels formed therein for directing air radially inwardly in a plane extending generally perpendicular to the central axis of the interior chamber, the swirl plate having a plurality of circumferentially spaced apart fuel inlet ports formed therein, each fuel inlet port adapted to admit an extruded fuel film into the interior chamber of the discharge section at a location adjacent a radially inner end of a corresponding air channel, such that air flowing through each channel intersects a corresponding fuel film at a predetermined angle to effect atomization of the fuel film; and b) a fuel injector communicating with each fuel inlet port, each fuel injector having an elongated tubular body including inner and outer concentric tubes that are separated from one another so as to define a fuel passage therebetween.

13. A fuel nozzle as recited in claim 12, wherein each fuel inlet port is aligned with the central axis of the interior chamber of the discharge section such that the air flowing through each channel intersects the fuel film issuing from each fuel inlet at a 90 degree angle.

14. A fuel nozzle as recited in claim 12, wherein the outer tube and the inner tube are separated from one another by a helical spacer wire brazed onto an exterior wall of the inner tube.

* * * * *